Oct. 27, 1959  R. D. GALLMEYER ET AL  2,910,042
MATERIAL-APPLYING APPARATUS FOR SEALING PIPES AND GAS MAINS
Filed Oct. 6, 1955  2 Sheets-Sheet 1
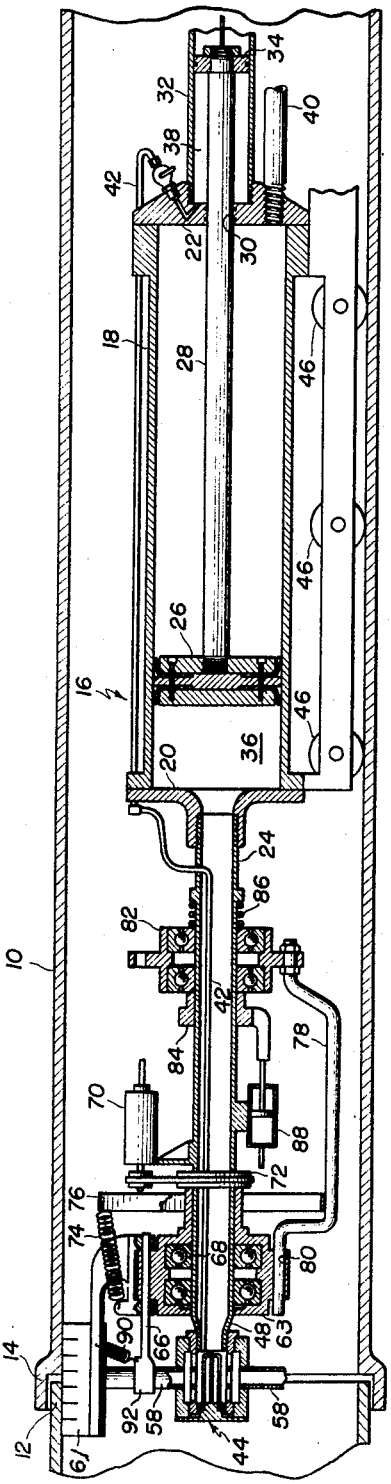
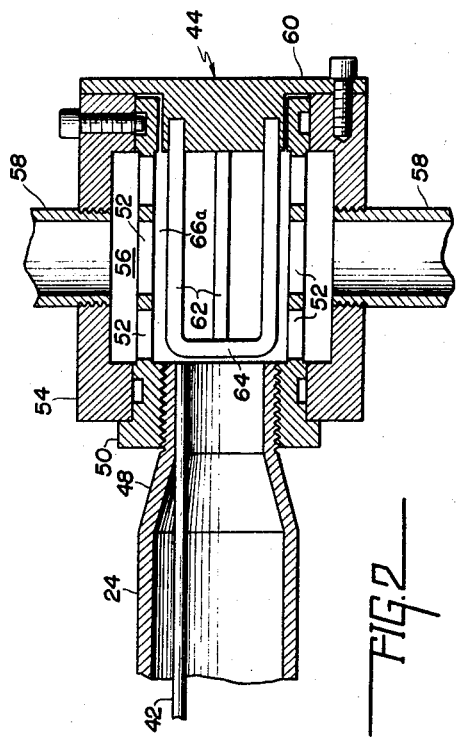
INVENTORS.
RICHARD D. GALLMEYER
LEE F. MCBRIDE
BY
Lockwood, Galt, Woodard, & Smith
ATTORNEYS United States Patent Office 2,910,042
Patented Oct. 27, 1959

2,910,042

MATERIAL-APPLYING APPARATUS FOR SEALING PIPES AND GAS MAINS

Richard D. Gallmeyer, Fort Wayne, and Lee F. McBride, Decatur, Ind., assignors to Charles W. Fuelling, Fort Wayne, Ind.

Application October 6, 1955, Serial No. 538,936

8 Claims. (Cl. 118—105)

The present invention relates to material-applying apparatus, and more particularly to apparatus having use for sealing fluid-tight mains, such as gas mains.

In Cook et al. application Ser. No. 473,402 filed Dec. 6, 1954 and entitled "Pipe Sealing Apparatus and Method" there is disclosed a means for sealing the joints of a gas main. These means included an apparatus which operated internally of the gas main to move successively from joint to joint to effect sealing of each joint by the application of a suitable plastic material thereto. This plastic material was carried by the apparatus and was highly viscous in composition. The composition was in two parts consisting of a base material and an accelerator which caused curing of the composition. There are innumerable materials of this character which when mixed together cause polymerization or curing within a short time. In the present instance, the addition of the accelerator to the base material is sufficient to cause curing under ordinary temperature conditions.

The apparatus of the aforementioned application was so arranged that the two parts or materials were premixed and then stored in the apparatus itself. Thus, curing started immediately so that if the mixed material was not dispensed from the apparatus within a given period of time, the material would cure and consequently foul the apparatus. Since the materials used adhered tenaciously to the apparatus parts when curing took place, and could not thereafter be removed without causing damage, it became necessary in almost all instances to discard the apparatus and substitute a new one.

The present invention constitutes an improvement over the previous one just described, principally in the respect that the apparatus cannot be fouled because of curing of material therein. Therefore it is an object of this invention to provide a material-applying apparatus which stores predetermined quantities of a plastic base material and an accelerator and mixes these together immediately adjacent the point of applying the mixed material, thereby preventing the apparatus from becoming fouled because of uncontrollable curing of material therein.

It is another object to provide a material-applying apparatus which operates interiorly of a gas main for applying a sealing material to localized areas thereof.

It is still another object of this invention to provide a material-applying apparatus having a mixing nozzle means wherein two different materials stored by the apparatus and thoroughly mixed are ejected thereby, the only portion of the apparatus receiving and handling the mixed materials being this nozzle means.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a cross-section of a gas main with an embodiment of the present invention disposed therein in operating position;

Fig. 2 is an enlarged cross-sectional view of the mixing swivel thereof; and

Figure 3:
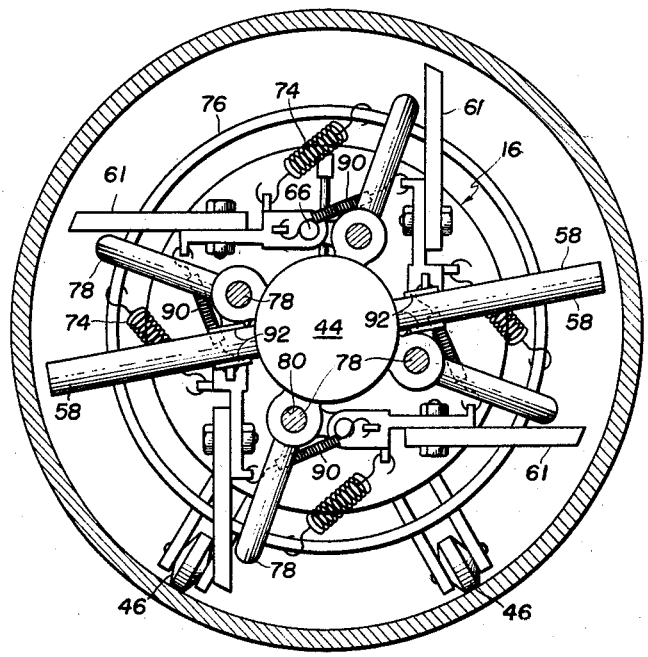
Fig. 3 is a view looking at the left-hand end of Fig. 1.

Referring to the drawings, a typical gas main 10 is shown as composed of a plurality of sections of cast iron or the like pipe of a given diameter, for example, twelve inches (12″). The ends of each pipe section are provided with mating spigot 12 and bell 14 portions which are suitably packed with caulking material to provide a gas-tight seal.

The apparatus of this invention, which is generally indicated by the reference numeral 16, operates interiorly of the main 10 and will now be described in detail. Certain portions of this apparatus which are not important to a complete understanding of this invention are not shown in the drawings; however, reference may be had to the aforementioned Cook et al. application Ser. No. 473,402 for a complete description and explanation of that portion of the apparatus which is not shown or described herein.

This apparatus comprises a cylinder 18 having end closure plates 20 and 22, respectively. Projecting forwardly from closure plate 20 is a hollow post or tube 24 which is constructed of suitably rigid material for a purpose which will later become apparent. The cylinder 18 receives a reciprocable piston 26 to which is affixed a piston rod 28 which passes through a sealed opening 30 in the end closure plate 22. To the rear of the closure plate 22 is secured a smaller cylinder 32 which receives a reciprocable piston 34. The base plastic material previously mentioned is normally disposed in the larger cylinder chamber 36 in front of the piston 26, whereas the liquid accelerator material is carried in the smaller cylinder chamber indicated by the reference numeral 38.

An air pressure line 40 is connected to the cylinder 18 for acting against the rear of the piston 26 to drive it forwardly and to eject base material from the chamber 36 into the tube 24 and accelerator material from the chamber 38 through a connecting line or conduit 42 forwardly to a mixing swivel 44 to be described in detail hereinafter.

A suitable set of rollers, indicated by the reference numeral 46, serve in transporting the complete apparatus through the gas main 10.

The mixing swivel 44 is carried by the forward end 48 of the tube 24 and is shown in enlarged detail by Fig. 2. This swivel comprises a stator or tubular element 50 which is threadedly received by the tube end 48, and is provided with a plurality of apertures 52. Rotatably mounted on the stator 50 is a rotor housing 54 which is provided with an internal diameter slightly larger than the outer diameter of the stator 50. The different diameters in turn provide a small annular chamber 56 for a purpose which will be explained in more detail hereafter. Extending radially outwardly from this chamber 56 are two or more nozzle tubes 58 which are carried by the rotor housing 54.

An end plate 60 is secured to the rotor housing 54 and carries a plurality of axially extending wire-like fingers 62, the ends of the fingers adjacent the pipe end 48 being secured together by radial portions 64 while the opposite ends are suitably secured, as by press-fitting, into suitable sockets to the plate 60.

This entire swivel assembly is so arranged that the rotor housing 54 may be rotated, thereby carrying the end closure 60 and the fingers 62 therewith. It will be noted that a slight radial clearance 66a is provided between the fingers and the apertured portion of the stator element 50.

Operation of so much of the apparatus as thus far described is caused by simultaneously advancing the two pistons 26 and 34 during the rotation of the mixing swivel 44. Material from the two pistons 26 and 34 is injected into the swivel 44 by means of the tube 24 and conduit 42, the fingers 62 serving to mix this material and cause it to flow outwardly through the stator apertures 52. Continued rotation causes the material which passes through the apertures 52 to flow into the chamber 56 from which the material flows outwardly through the nozzle tubes 58.

As will be seen in Figs. 1 and 3, these nozzle tubes 58 terminate adjacent the surface of the gas main 10 so that mixed material may be deposited on the wall thereof in the form of an annulus.

Continuing with the description of the apparatus, a plurality of retractable paddles or applicators 61 (see Figs. 1 and 3) are pivotally mounted on the circumference of a rotary hub 63 by means of suitable hinge pins 66. The hub 63 is mounted for rotation on the tube 24 by means of suitable bearings 68. The hub 63 is driven by an air motor 70 suitably mounted on the tube 24 and a sprocket and chain connection 72. Thus, rotary motion of the air motor 70 is imparted to the hub 63 for causing corresponding rotation of the paddles 61. These paddles 61 are shown in their protracted position whereupon they rub the wall of the gas main 10. They are held in this protracted position by a series of coiled springs 74 which are connected between each paddle and a suitable frame ring 76 (see Figs. 1 and 3). This frame ring 76 is carried by a plurality of longitudinal extending frame rods 78 which are reciprocably received by suitable axially extending bores 80 in the exterior of the hub 63. The opposite ends of the frame rods 78 are secured to a suitable rotary collar 82 which is reciprocable on the tube 24 (see Fig. 1). A thrust collar 84 slidable on the tube 24 bears against the left-hand side of the collar 82 while a compression spring 86 which is coiled around the tube 24 bears against the opposite side of the collar 82. A power cylinder 88 which is operated by air pressure is connected to the thrust collar 84 whereby reciprocating action thereof will result in corresponding reciprocating action of the collar 82, the frame rods 78, and the frame ring 76.

When the air cylinder 88 is operated to move the frame ring 76 toward the right, the paddles 61 are pivoted on their respective pins 66 by the force of the springs 74 until the paddles engage the wall of the gas main 10 as shown. During this paddle engagement, actuation of the motor 70 will cause corresponding rotation of the paddles 61.

The paddles 61 are retracted, i.e., pivoted inwardly, away from the wall of the gas main 10 by means of the retracting springs 90 which are connected between the respective paddles 61 and an extension on each hinge pin 66. These springs 90 are under tension, so that when the power cylinder 88 is retracted the collar 82 as well as the frame ring 76 will be moved to the left under the influence of the compression spring 86 to release the protracting springs 74. When this occurs, the retracting springs 90 exert sufficient force to pivot the respective paddles 61 inwardly as illustrated by Fig. 3.

It is well to note at this point that Fig. 1 illustrates the apparatus in position for applying material to a selected joint 12, 14, whereas Fig. 3 shows the paddles 61 retracted.

The forward ends of the hinge pins 66 are bifurcated as shown at 92 to straddle the respective swivel nozzle tubes 58 as is shown more clearly in Fig. 3. Thus, as the hub 63 rotates to cause rotation of the paddles 61, the nozzles 58 are correspondingly rotated in turn to cause rotary movement of the mixing swivel 44.

In operation, the entire apparatus designated by the reference numeral 16 is transported inside a gas main 10 by means of a cable or the like from joint to joint, whereupon the apparatus is actuated to apply sealing material to each joint. During transporting movement, the blades 61 are retracted as shown in Fig. 3. The apparatus is then moved longitudinally of the gas main 10 until the paddles 61 are disposed in exact registry as shown in Fig. 1 with a selected joint. Thereupon air pressure is simultaneously applied to the cylinder 18 by means of the tube 40, to the air motor 70 and the power cylinder 88. When this occurs, the paddles 61 are protracted into rotating engagement with the wall of the gas main and the two pistons 26 and 34 force material into the mixing swivel 44. The mixing swivel 44 thoroughly mixes the base material and accelerator material together following which the mixed material exudes from the nozzle tubes 58 onto the pipe joint. The paddles 61 thereupon smear the mixed material over the wall of the tube and further works the material into the cracks thereby effecting a perfect seal. Within a short time following the application of this material to the joint, the material cures and provides a permanent fluid-tight seal.

The plastic materials used in this apparatus may vary according to a user's preference; however, suitable materials are on the market, one of which is compounded of synthetic rubber known by the trademark "Thiokol" and is produced and sold by the Minnesota Mining & Manufacturing Company. This material is, in essence, a rubber compound and is so viscous in its raw state that it pours with extreme slowness. The accelerator is in liquid form. It is absolutely necessary that these two materials be thoroughly mixed together in order to effect proper homogenous curing of the final mixture, so it is evident that the mixing swivel 44 must effect thorough mixing upon single passage of the material therethrough.

It has been found that these particular materials are best mixed together by folding the accelerator into the base material. That is to say, in essence, the base material is worked back and forth into a form resembling layers or laminations and the accelerator material is interposed between each lamination.

The particular mixing swivel 44 of this invention accomplishes this since the fingers 62 tend to produce laminations which receive accelerator material therebetween from the conduit 42. Thus is achieved the folding action previously mentioned. Further mixing action is achieved by the material exuding through the stator apertures 52 in a radial direction, after which the mixed material enters chamber 56 and is rotated by the rotor housing 54. The material then changes from its rotary action to move radially outwardly through the nozzle tubes 58. This radial movement is accomplished by reason of the fact that the stator wall which has the apertures 52 is sufficiently thick to create a definite interference to the rotary motion to the plastic material as it is rotated by the fingers 62. The importance of this thickness dimension is readily understood by considering what would occur if the thickness was zero or infinitesimally thin. If the wall were this thin, the material as rotated by the fingers 62 would merely pass through the openings 52 and would continue the rotary motion. However, by using the thickened wall for the opening 52, the rotating material engages the edges of the openings and thereupon is changed in direction to moving radially outwardly, thereupon producing a type of turbulence which insures the proper mixing action.

By performing the mixing of the two materials in the mixing swivel 44, it is seen that the remaining portions of the overall apparatus 16 is free from any material that can cure and cause fouling thereof. Thus, it is possible to use the apparatus to coat or seal a plurality of joints, for example fifty (50) joints, then withdraw the apparatus from the pipe, recharge it, and replace the used swivel 44 with a clean one. The same apparatus is then reused to seal another series of joints.

What is claimed is:

1. An apparatus of the character described comprising first and second metering devices which are operatively interconnected to deliver proportionate quantities of different fluid plastic materials, a material-mixing mechanism having inlet and discharge portions, two separate conduit means leading from said first and second devices respectively to said mechanism, said mixing mechanism including relatively movable elements interposed between said inlet and discharge portions, one element being disposed adjacent the inlet portion and serving to impart rotary motion to the plastic materials, a second element disposed adjacent said one element and serving to change the direction of motion of said materials from rotary to radially outward motion, a third element adjacent said second element and serving to change the direction of motion of said materials from radially outward to rotary motion, and nozzle means operatively connected to said discharge portion for receiving mixed material therefrom.

2. An apparatus of the character described comprising first and second metering devices which are operatively interconnected to deliver proportionate quantities of different fluid plastic materials, a material-mixing mechanism having inlet and discharge portions, two separate conduit means leading from said first and second devices respectively to said mechanism, said mixing mechanism including relatively movable elements interposed between said inlet and discharge portions, one element being disposed adjacent the inlet portion and serving to impart rotary motion to the plastic materials, a second element disposed adjacent said one element and serving to change the direction of motion of said materials from rotary to radially outward motion, a third element adjacent said second element and serving to change the direction of motion of said materials from radially outward to rotary motion, nozzle means operatively connected to said discharge portion for receiving mixed material therefrom, and a rotary applicator operatively associated with said nozzle for receiving mixed material therefrom and applying the same to a selected surface.

3. An apparatus of the character described comprising first and second fluid-metering cylinders which are operatively interconnected to deliver proportionate quantities of different fluid plastic materials, a mixing head, two separate conduits leading from said first and second cylinders to said mixing head respectively, relatively rotatable elements contained in said head for mixing quantities of said materials delivered thereto, and a rotary nozzle carried by one of said rotatable elements for receiving mixed material from said head and delivering it to a selected point.

4. An apparatus of the character described comprising a stationary support, two separate fluid-metering cylinders carried by said support, said cylinders being interconnected to deliver proportionate quantities of different plastic material, a stationary tubular element having openings in the wall thereof carried by said support, two conduits for delivering plastic material from said cylinders, respectively to said tubular element, a rotary mixing element disposed inside said tubular element for imparting rotary movement to the plastic material therein, a housing rotatable on the exterior of said tubular element and providing a chamber therebetween which receives plastic material from said tubular element openings, and nozzle elements carried by said housing and communicating with said chamber for receiving plastic material therefrom.

5. An apparatus of the character described comprising a stationary support, two separate fluid-metering cylinders carried by said support, said cylinders being interconnected to deliver proportionate quantities of different plastic material, a stationary tubular element having openings in the wall thereof carried by said support, two conduits for delivering plastic material from said cylinders, respectively, to said tubular element, a rotary mixing element disposed inside said tubular element for imparting rotary movement to the plastic material therein, a housing rotatable on the exterior of said tubular element and providing a chamber therebetween which receives plastic material from said tubular element openings, nozzle elements carried by said housing and communicating with said chamber for receiving plastic material therefrom, and a rotary applicator carried by said support and disposed adjacent said nozzle for receiving plastic material from said nozzle and applying it to a cylindrical surface.

6. An apparatus of the character described comprising two separate tandem arranged fluid-metering cylinders interconnected to deliver proportionate quantities of different plastic materials, a stationary supporting tube coaxially extending from said cylinders, a mixing head rotatably mounted on the end of said supporting tube, an applicator rotatably mounted on the exterior of said tube, a nozzle carried for rotation by said mixing head and having a discharge end adjacent said applicator, and two stationary conduits passing interiorly of said applicator and interconnecting said mixing head and said two cylinders respectively whereby separate quantities of plastic material from said cylinders are delivered to said head for mixing and delivery to said applicator.

7. An apparatus of the character described comprising a stationary support, two separate fluid-metering cylinders carried by said support, said cylinders being interconnected to deliver proportionate quantities of different plastic material, a stationary tubular element having openings in the wall thereof carried by said support, two conduits for delivering plastic material from said cylinders, respectively to said tubular element, a rotary mixing element disposed inside said tubular element for imparting rotary movement to the plastic material therein, a housing rotatable on the exterior of said tubular element and providing a chamber therebetween which receives plastic material from said tubular element openings, the thickness of the stationary tubular element wall being such as to change the direction of movement of material which passes therethrough, and nozzle elements carried by said housing and communicating with said chamber for receiving plastic material therefrom.

8. An apparatus for mixing different plastic materials comprising first and second fluid-metering cylinders having interconnected pistons operable to deliver proportionate quantities of different plastic materials, a mixing head, two separate conduits leading from said first and second cylinders to said mixing head, relatively rotatable elements mounted in said head for mixing plastic materials delivered thereto, and a nozzle carried by one of said rotatable elements for receiving mixed material from said head and discharging it.

References Cited in the file of this patent

UNITED STATES PATENTS

| 1,455,065 | Bellows | May 15, 1923 |
| 1,969,533 | Pipes et al. | Aug. 7, 1934 |
| 1,988,329 | Perkins | Jan. 15, 1935 |
| 2,099,076 | Perkins | Nov. 16, 1937 |
| 2,352,749 | Wills | July 4, 1944 |
| 2,575,353 | MacEvoy | Nov. 20, 1951 |
| 2,768,405 | Mineah | Oct. 30, 1956 |
| 2,814,827 | Snow et al. | Dec. 3, 1957 |